United States Patent [19]

Brault et al.

[11] Patent Number: 5,170,662
[45] Date of Patent: Dec. 15, 1992

[54] BALANCE FOR MEASURING THE THRUST OF A TURBOJET ENGINE

[75] Inventors: J. Henri Brault, Brie Comte Robert; Arnaud Cotterlaz, Paris; Jacques M. Delorme, Combs La Ville, all of France

[73] Assignee: Societe Nationale d'Etude et de Construction de Moteurs d'Aviation "S.N.E.C.M.A.", Paris, France

[21] Appl. No.: 722,151

[22] Filed: Jun. 27, 1991

[30] Foreign Application Priority Data

Jun. 27, 1990 [FR] France ............................... 90 08067

[51] Int. Cl.⁵ .......................................... G01M 15/00
[52] U.S. Cl. ................................. 73/117.4; 73/862.56
[58] Field of Search .............. 73/117.4, 862.54, 862.56

[56] References Cited

U.S. PATENT DOCUMENTS

| | | | |
|---|---|---|---|
| 3,205,704 | 9/1965 | Taylor | 73/116 |
| 3,218,849 | 11/1965 | Marvinney et al. | 73/117.4 |
| 3,463,001 | 8/1969 | Webb | 73/117.4 |
| 3,527,088 | 9/1970 | Weekley | 73/117.4 |

FOREIGN PATENT DOCUMENTS 1389209 1/1965 France .

Primary Examiner—Jerry W. Myracle
Attorney, Agent, or Firm—Oblon, Spivak, McClelland, Maier & Neustadt

[57] ABSTRACT

A balance for measuring the thrust of a turbojet engine comprises a movable frame suspended by flexible suspension strips from an interface structure fixed to the ceiling of a building housing the balance, an adaptor by which the turbojet engine is mounted to the movable frame, and a thrust measuring system fixed to the interface structure and connected to the movable frame to measure the longitudinal force exerted on the frame by the turbojet engine when the engine is in operation. The flexible suspension strips consist of two front suspension strips disposed in a transverse plane symmetrically one on each side of a longitudinal median plane through the balance, and one rear suspension strip disposed transversely in the longitudinal median plane of the balance, these three suspension strips providing an isostatic suspension of the movable frame from the fixed interface structure.

8 Claims, 7 Drawing Sheets

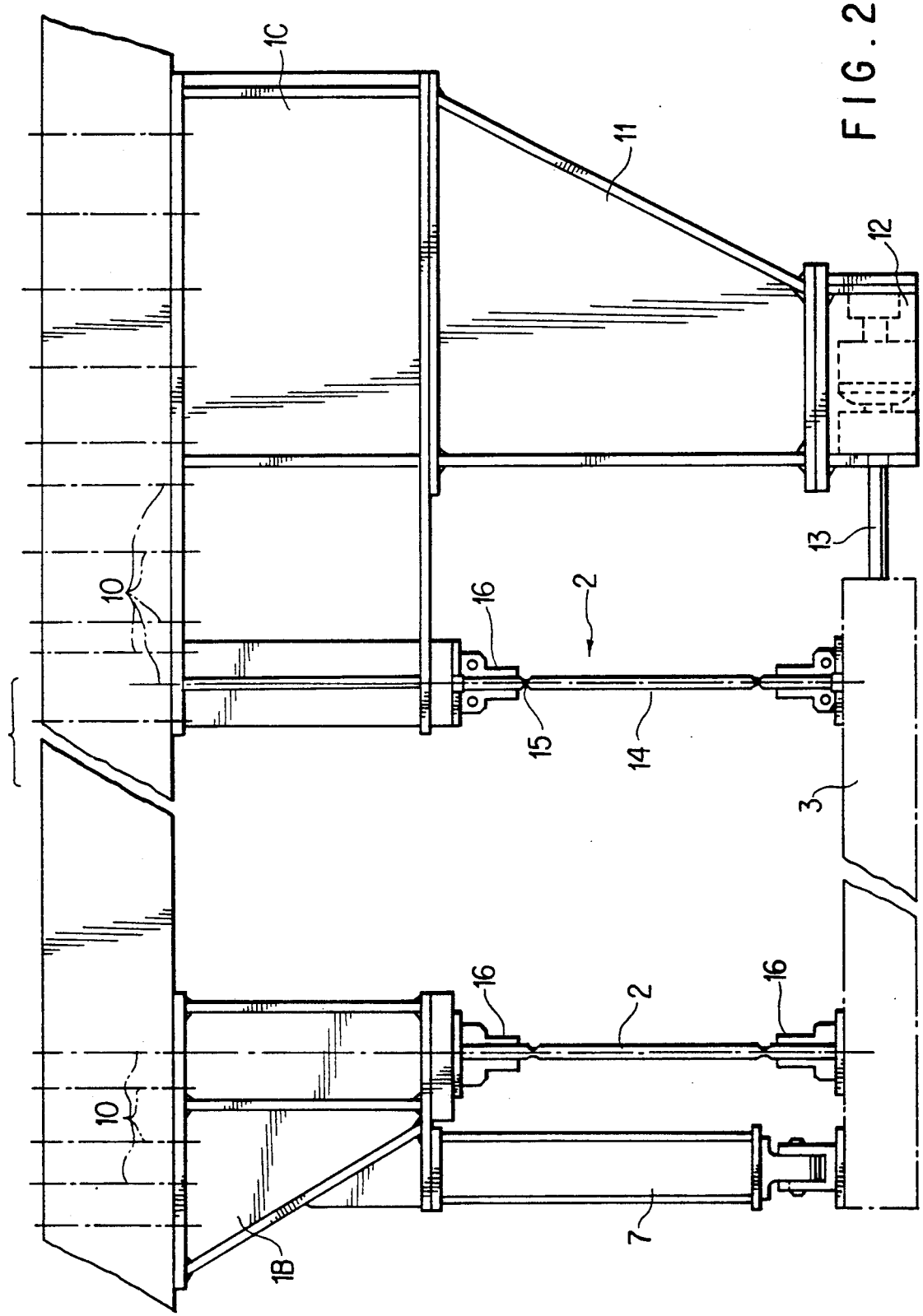

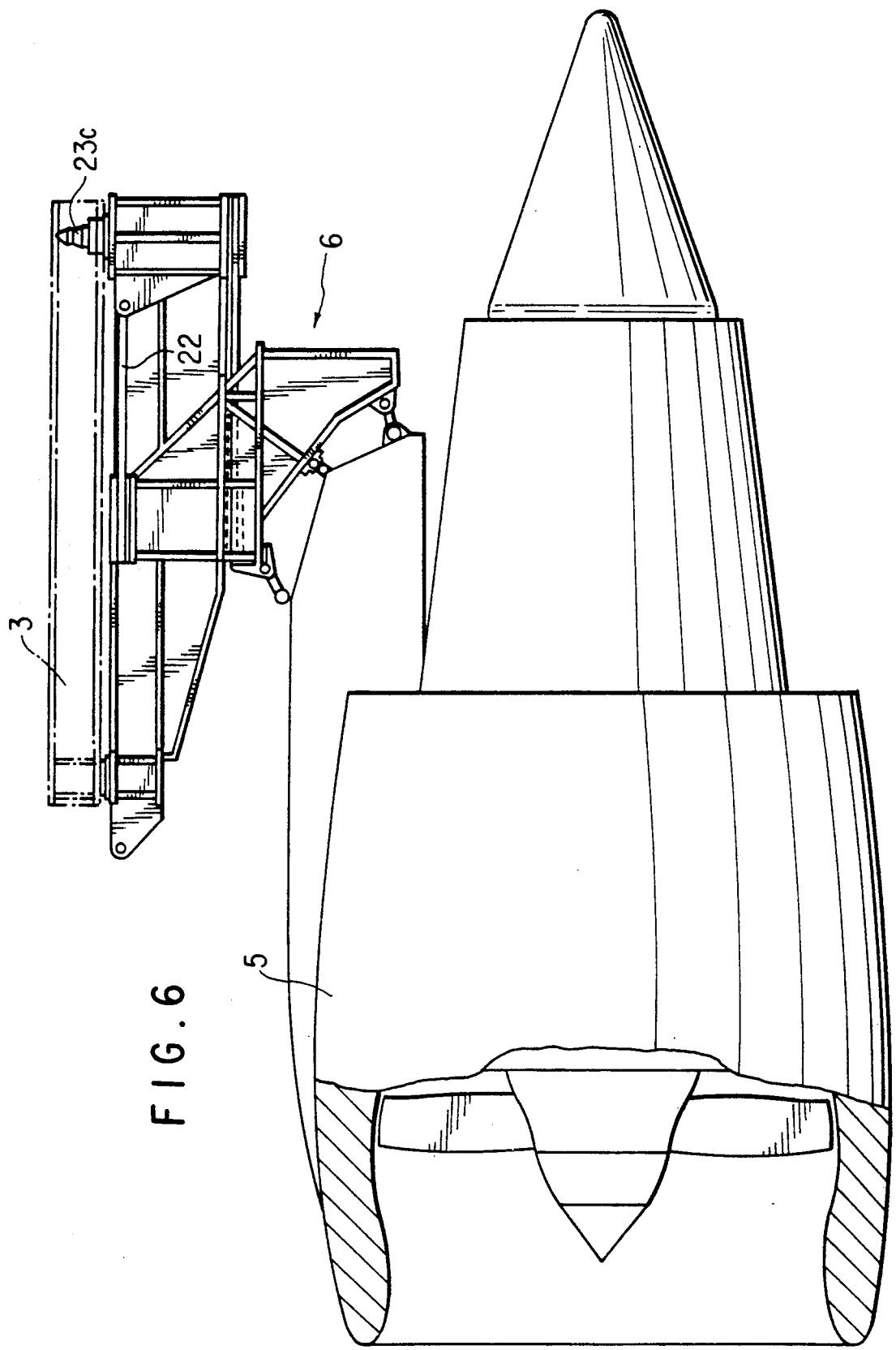

BALANCE FOR MEASURING THE THRUST OF A TURBOJET ENGINE

BACKGROUND OF THE INVENTION

1. Field of the Invention

The present invention relates generally to test beds for turbojet engines for aircraft, and more precisely to balances for measuring the thrust of turbojet engines.

2. Summary of the Prior Art

Test beds for turbojet engines consist of a building inside which the turbojet engine to be tested is suspended from a structure for its working tests, while an adjacent control room enables all the tests to be controlled and the results to be evaluated.

Generally, the turbojet engine suspension structure has two functions: firstly it makes it possible to mount the engine inside a building adapted for the tests and acoustically insulated from the control room, and secondly it makes it possible to measure the effective static thrust of the engine.

For this, it is conventional to fit the engine with an adaptor which simulates the attachment arrangement of the turbojet engine so that it is equivalent to that of an actual mounting of the turbojet engine on a support pylon of an aircraft. This adaptor is then fixed under a thrust measuring balance which generally comprises a movable frame, a fixed frame and an interface structure.

Measurement of the thrust is conventional and is accomplished by measuring the longitudinal force generated by the engine when it is operating (thrust) and transmitted to the measuring system through the movable frame and connecting rods for taking the strain.

The movable frame is traditionally fixed to the fixed frame by four vertical flexion strips, and extremely accurate sensors for measuring displacement are disposed between the fixed frame and the movable frame.

The accuracy of the sensors is extremely important because the true thrust of the engine is calculated on the basis of the force which gives rise to the deformations in the various structures through which it passes. The more complex the route, the greater the dispersion and the less accurate the result. To obtain the degree of accuracy of 1 to 2 parts per thousand required for these thrust measurements, it is necessary to provide highly sophisticated mountings as well as extremely accurate fixed and movable frames.

In existing balances, the mountings have four suspension strips and are hyperstatic, creating prestresses in the measuring balance which make it essential to employ even more precise, and therefore more expensive, measuring sensors.

It is an object of the present invention to provide a measuring balance which minimises the aforementioned drawbacks by ensuring a completely isostatic mounting of the engine on its test bed.

A further object of the invention is to overcome the majority of the risks of Prestresses in the measuring balance assembly, which will make it possible to use less sophisticated (and therefore less expensive) measuring sensors than in the past in order to arrive at improved measurement accuracy.

SUMMARY OF THE INVENTION

According to the invention, there is provided a balance for measuring the thrust of a turbojet engine comprising an interface structure adapted to be fixed to the ceiling of a building for housing said balance, a movable frame, flexible suspension strips attached to said interface structure and to said movable frame for suspending said movable frame from said interface structure, an adaptor for fitting to said turbojet engine whose thrust is to be measured, connecting means for securing said adaptor to said movable frame so as to mount said turbojet engine to said movable frame, and a thrust measuring system mounted on said interface structure and connected to said movable frame for measuring the longitudinal force exerted on said movable frame by said turbojet engine when said engine is in operation, wherein said flexible suspension strips consist of two front suspension strips disposed in a transverse plane symmetrically one on each side of a longitudinal median plane through said balance, and one rear suspension strip disposed transversely in said longitudinal median plane of said balance, these three suspension strips providing an isostatic suspension of said movable frame from said interface structure.

Preferably, the connecting means includes three centering devices for positioning said adaptor beneath said movable frame, said three centering devices being arranged to ensure isostatic blocking of six degrees of freedom between said adaptor and said movable frame and consisting of two front centering devices disposed in axial alignment with said two front suspension strips, and a rear centering device disposed in axial alignment with said rear suspension strip, said rear centering device blocking three degrees of freedom while a first of said two front centering devices blocks one degree of freedom and a second of said two front centering devices blocks two degrees of freedom.

In a preferred embodiment of the invention the movable frame is in the form of a horizontal U which is open towards the front of said balance, and said interface structure comprises two separate front parts and one central rear part, each of said front parts supporting a respective one of said front suspension strips, and said rear part supporting said rear suspension strip. The advantage of this arrangement is that it is compatible with three possible methods of hoisting the turbojet engine into position on the balance, using a winch system carried either by the movable frame or by the ceiling of the building, or using a winch system adapted to move along a monorail disposed on the ceiling of the building and passing between the front parts of the interface structure.

The assembly in accordance with the invention does not entail any stresses (or does so only minimally), and is therefore able to manage with a movable frame and interface structure which are mechanically welded structures of no great precision. These structures are therefore relatively inexpensive and are capable of being produced without complex technology, because errors in accuracy in the production of these structures will not result in any stresses in the assembly.

The invention also enables thrust measuring balances to be made which are capable of testing a far wider range of turbojet engines ranging from 100 Kn to 600 Kn of thrust. This is made possible by the great simplicity of the structures, which makes more space available for the engine and makes it possible to introduce engines measuring 3 to 4 metres in diameter into standard size rooms, something which is impossible with an existing test bed assembly.

Further features and advantages of the invention will become apparent from the ensuing description, with reference to the drawings, of a preferred embodiment of the invention.

BRIEF DESCRIPTION OF THE DRAWINGS

FIG. 2 is an elevational view of the interface structure of the balance fitted with the suspension strips and with safety bars, and also showing the thrust measuring device.

FIG. 6 is an elevational view of a turbojet engine fitted with its adaptor which enables it to be fixed to the movable frame.

DESCRIPTION OF THE PREFERRED EMBODIMENT

Figure 1:
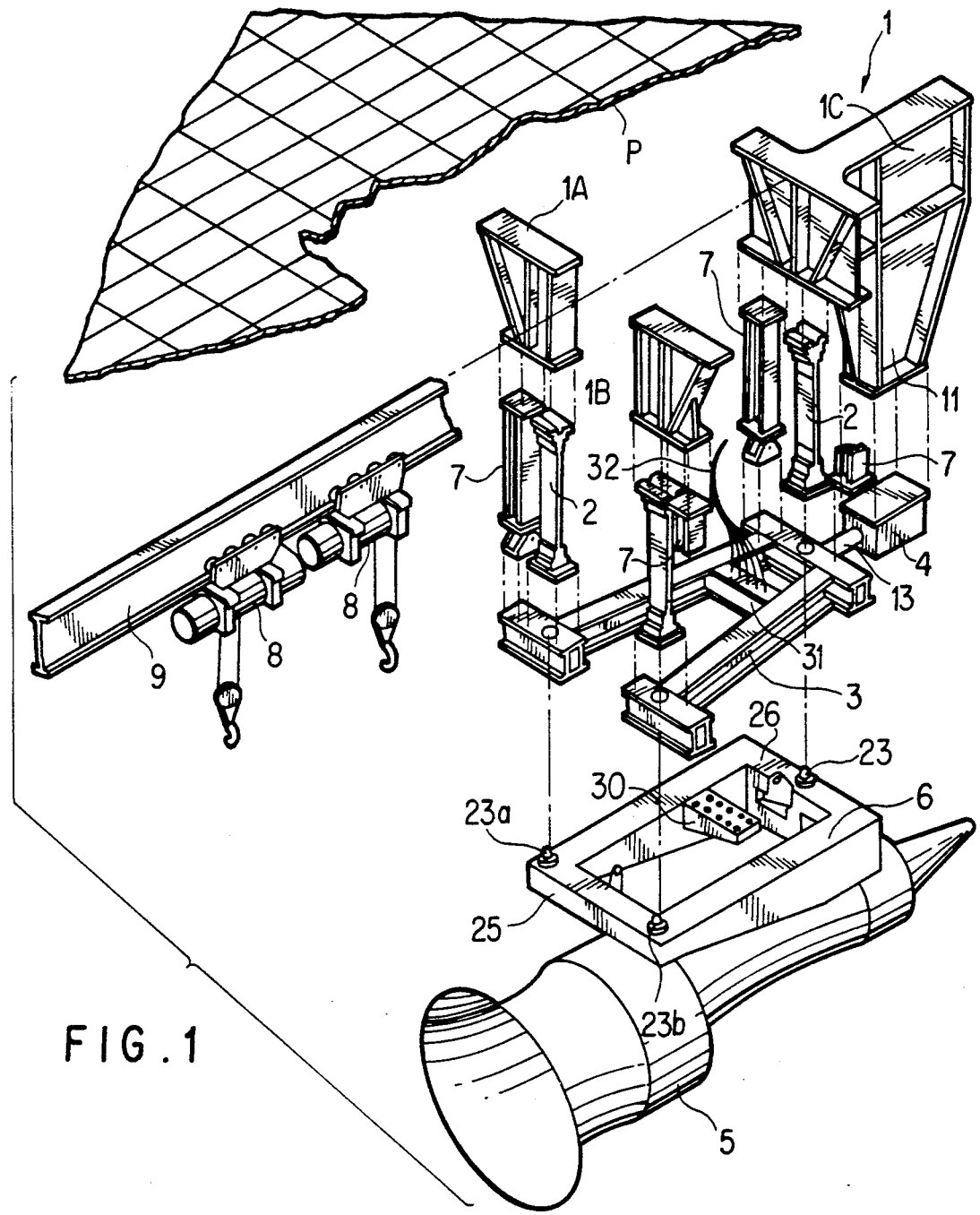
FIG. 1 is an exploded perspective view of one embodiment of the thrust measuring balance in accordance with the invention and of a turbojet engine equipped with its adaptor.

With reference to FIG. 1, the thrust measuring balance comprises:
an interface structure 1 consisting of two separate front parts 1A and 1B, and a rear Part 1C;
three flexible suspension strips 2 fixed to the interface structure 1 for suspending a movable frame 3 in the shape of a horizontal U which is open towards the front;
a thrust measuring system 4 located to the rear of the movable frame 3 between the movable frame and a vertical part 11 of the rear part 1C of the interface structure;
an adaptor 6 fitted to a turbojet engine 5 for attaching the engine under the movable frame 3;
four vertical safety bars 7 between the interface structure 1 and the movable frame 3; and
a winch hoisting system 8 carried by a monorail 9 fixed to the ceiling of the building in which the test bed is installed. Other alternative forms of hoisting system will be described later.

The various sub-assemblies of the balance will now be described with reference to the respective Figures of the drawings which show them, commencing from the top of the balance and finishing with its lowest part, i.e. the adaptor.

The interface structure is shown in FIGS. 1 and 2. The two front parts 1A and 1B and the rear part 1C are in the form of mechanically welded structures which are fixed at 10 to the ceiling P of the building housing the balance. The rear part 1C comprises a rear vertical portion 11 situated in the longitudinal, vertical median plane of the balance and under which there is mounted a casing 12 containing the thrust measuring system 4 which is connected by a rod 13 to the movable frame 3. The two front parts 1A and 1B are disposed symmetrically one on each side of the longitudinal median plane of the balance.

Under each of the front parts 1A and 1B and centrally under a transversely extending forward portion of the rear part 1C there is attached a respective vertical, flexible suspension strip 2. The two front strips 2 lie in a common transverse, vertical plane symmetrically disposed on opposite sides of the longitudinal median plane of the balance, and the rear strip 2 lies in a transverse vertical plane at its intersection with the longitudinal median plane.

Figure 3:
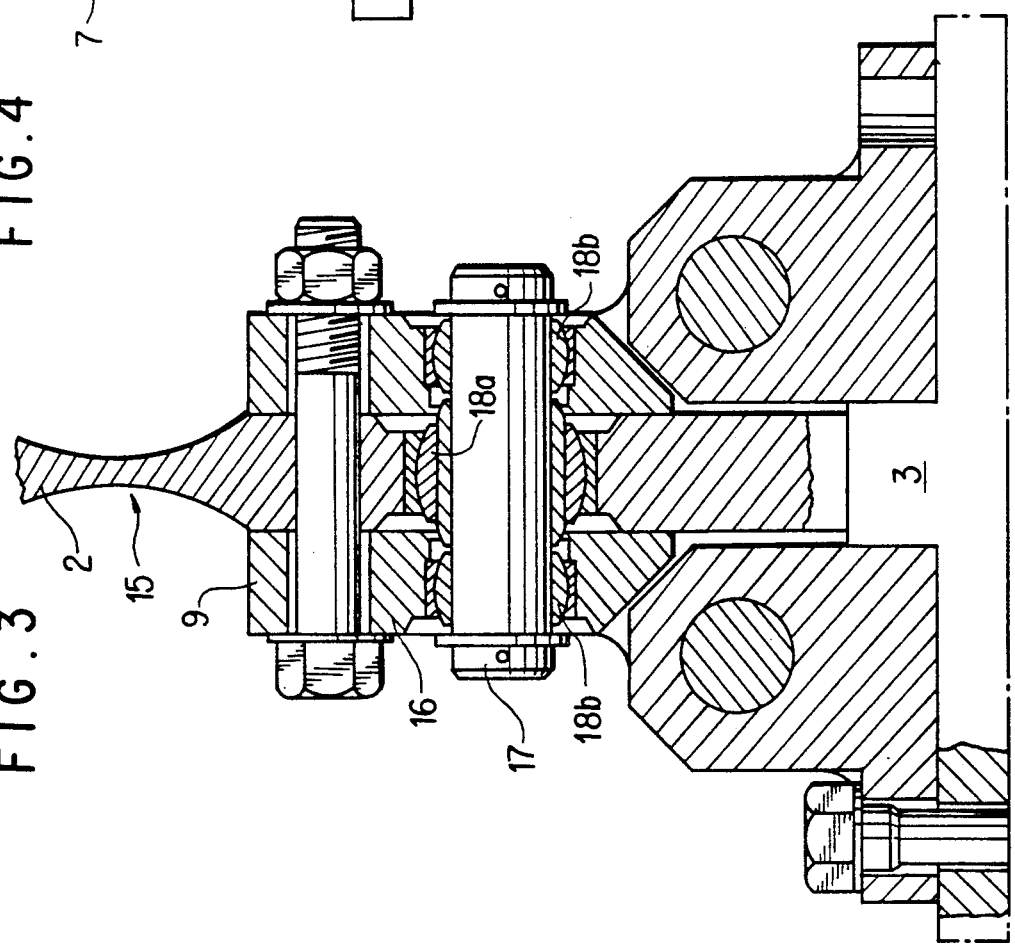
FIG. 3 is a sectional view showing the method of attaching the flexible suspension strips to the interface structure and the movable frame.

As shown in FIGS. 2 and 3, the suspension strips 2 each comprise a web 14 of rectangular cross-section and a thin portion 15 of increased flexibility near each end. Each strip 2 is held at each end between a pair of plates 16 fixed to the interface structure or the movable frame by means of spindles 17 supporting three swivel joints 18a and 18b permitting a stress-free flush fitting of the strip and by means of bolts 19 which, with a radial clearance, hold the strip 2 and the plates 16 together.

Figure 4:
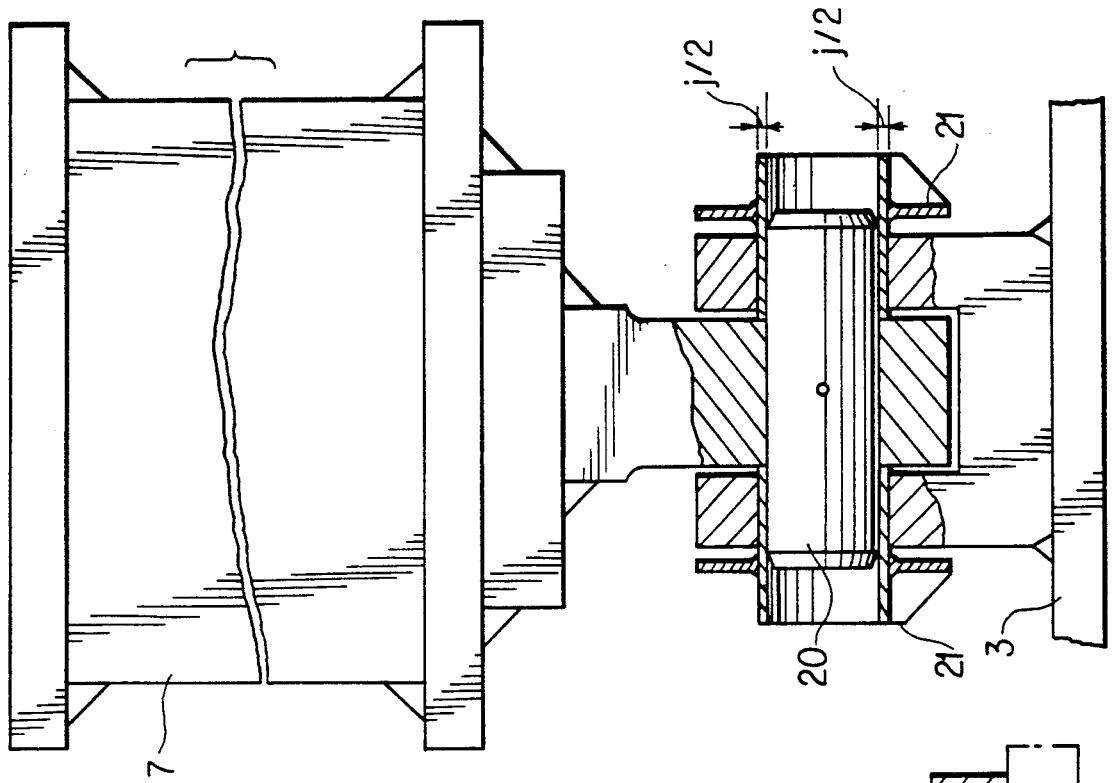
FIG. 4 is a sectional view showing the attachment of the vertical safety bars to the interface structure and the movable frame.

As shown in FIGS. 1, 2 and 4, four vertical safety bars 7 are disposed between the interface structure 1 and the movable frame 3, each bar 7 being mechanically welded to the interface structure and attached to the movable frame by a spindle 20 provided with a radial clearance j and secured by a cotter pin.

When the balance is being transported and set-up, wedges 21 are placed around the spindles 20 to eliminate the clearance j so that the movable frame 3 is coupled substantially rigidly to the interface structure and the flexible suspension strips 2 are not stressed.

When the balance is in operation, the wedges 21 are withdrawn so that the movable frame 3 is actually suspended from the interface structure 1 by the flexible strips 2 which are capable of flexing without constraint. The safety bars have no effect under these conditions, but are dimensioned so that they will come into operation to take up the static and dynamic stresses generated by the movable frame 3, the adaptor 6 and the turbojet engine 5 in the event of accidental breakage of one or more of the suspension strips 2 or of the connecting rod 13.

Figure 5:
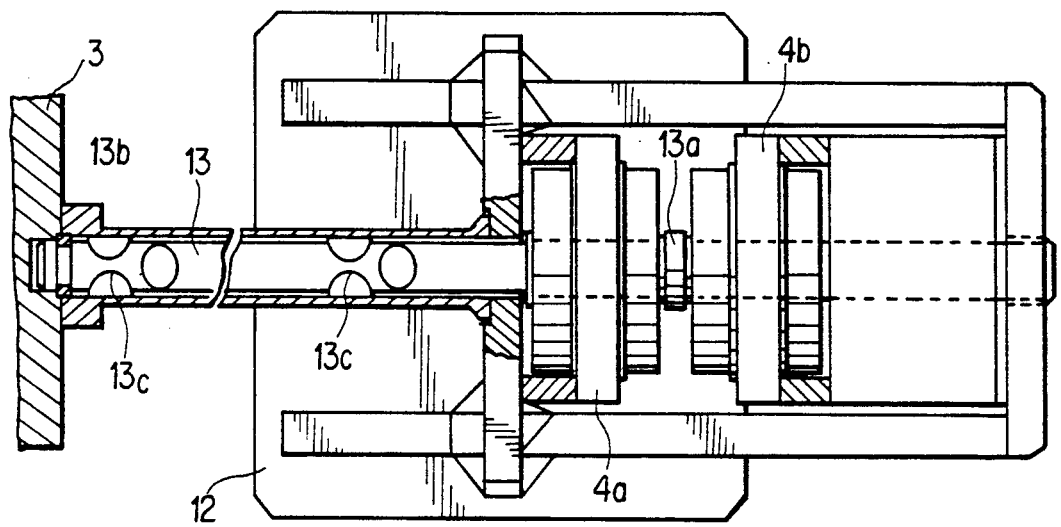
FIG. 5 is a part-sectional, part-elevational view of the thrust measuring device mounted between the interface structure and the movable frame.

If one now considers FIG. 5 showing the thrust measuring system 4 which is disposed between the rear vertical portion 11 of the interface structure 1 and the movable frame 3, it can be seen that the system comprises two force sensors 4a and 4b disposed on a common horizontal rod 13 (i.e. the connecting rod mentioned earlier) which passes through the casing 12. The rod 13 comprises a shoulder 13a disposed between the two sensors, the sensor 4a acting as a measuring sensor and the sensor 4b as a verification sensor. At its end 13b the rod 13 is fixed to the movable frame 3, and double cardan joints 13c are provided in the rod to enable longitudinal positioning of the frame without the suspension strips 2 being prestressed.

When the turbojet engine 5 is operated so that its thrust can be measured, the increasing turbojet thrust exerts a longitudinal force on the movable frame 3 in a forwards direction. This force is conveyed through the rod 13 and the shoulder 13a to place the measuring sensor 4a under compression. From this dynamometric compression, it is possible to deduce the force exerted on the sensor and therefore the thrust generated by the turbojet engine. By reason of the absence of stress between the structure 1 and the frame 3, and the particular structure of the rod 13, the overall accuracy of the measuring balance is improved.

With regard to the positioning of the turbojet engine 5 on the movable frame 3, an adaptor 6 is first fixed on the jet engine. This has two purposes. Firstly, it acts as an interface which, being adapted to a given engine 5 (range of thrust, particular dimensions), makes it possible to test this particular engine on a test bed housing a thrust balance capable of receiving any other type of engine of different thrust and size. Secondly, by virtue of being constructed in the form of flexion bars 22, the adaptor 6 faithfully reproduces the method of mounting the turbojet engine 5 under the suspension mast of the aircraft in which it is intended to be used, thus making it possible to carry out realistic measurements on the engine under test.

Figure 7:
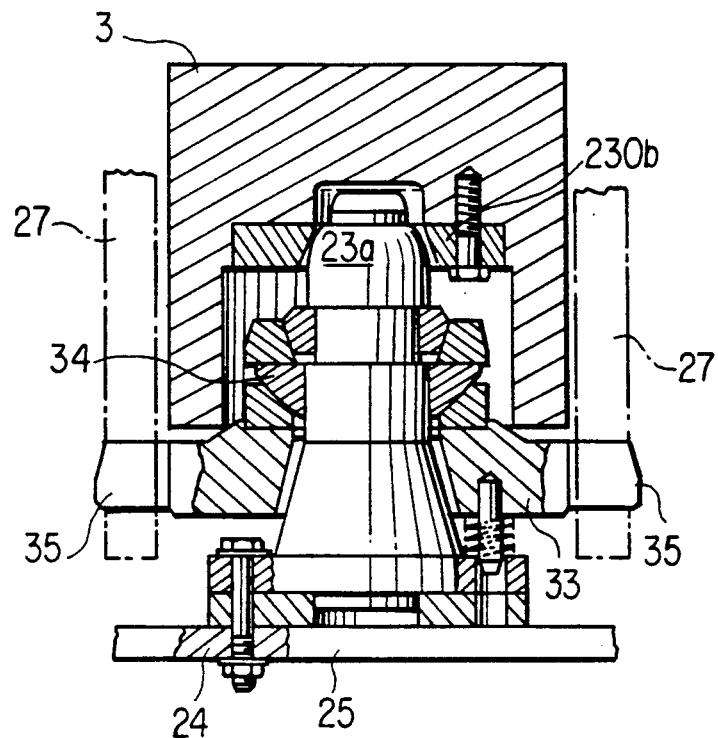
FIGS. 7, 8 and 9 are part sectional views respectively showing two forward centering devices and a rear centering device for positioning the adaptor on the movable frame.
Figure 8:
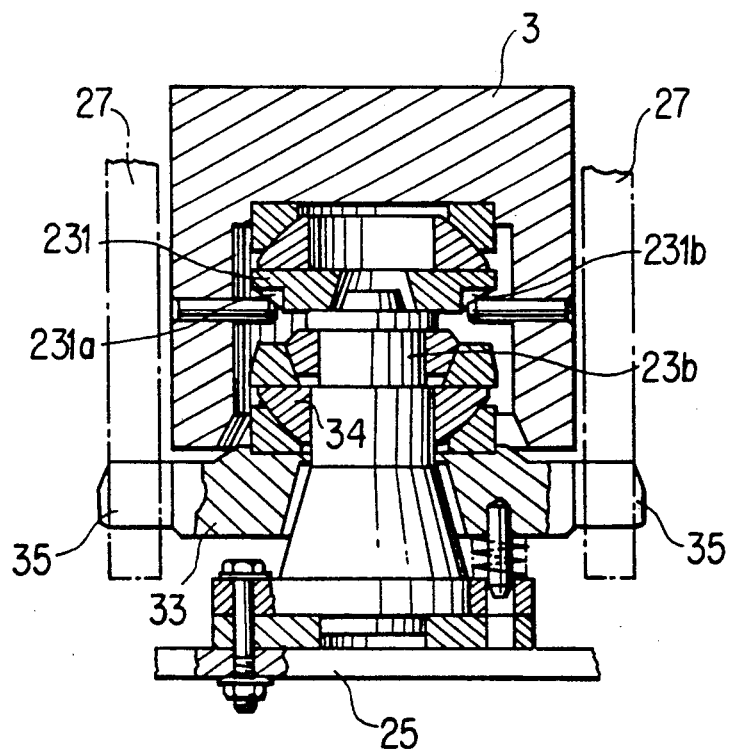

To fix the adaptor 6 under the movable frame 3, it is important firstly to Position it isostatically in a single plane in order not to introduce an stresses into the assembly. To achieve this, the adaptor comprises three centering devices 23, two at the front and one at the rear, and by positioning them isostatically in axial alignment with the respective suspension strips 2, they ensure mechanical continuity for the transmission of three directional forces. The centering devices 23 are shown in FIGS. 7, 8 and 9.

The front centering device (FIG. 7) is fixed by bolts 24 on the front cross-member 25 of the adaptor 6, and comprises a vertical finger 23a which has a part-spherical bearing surface 230a arranged to engage a dihedral surface 230b carried by the movable frame 3. The centering by means of the spherical/dihedral surface contact provides a linear contact which blocks one degree of freedom.

The other front centering device (FIG. 8) is likewise bolted to the front cross-member 25 of the adaptor 6 and comprises a vertical finger 23b. In this case, however, the top end of the finger has a flat top surface 231a which is arranged to engage a flat surface 231b of a cup 231 carried by the movable frame 3, thus providing a flat bearing-surface contact which blocks two degrees of freedom.

Figure 9:
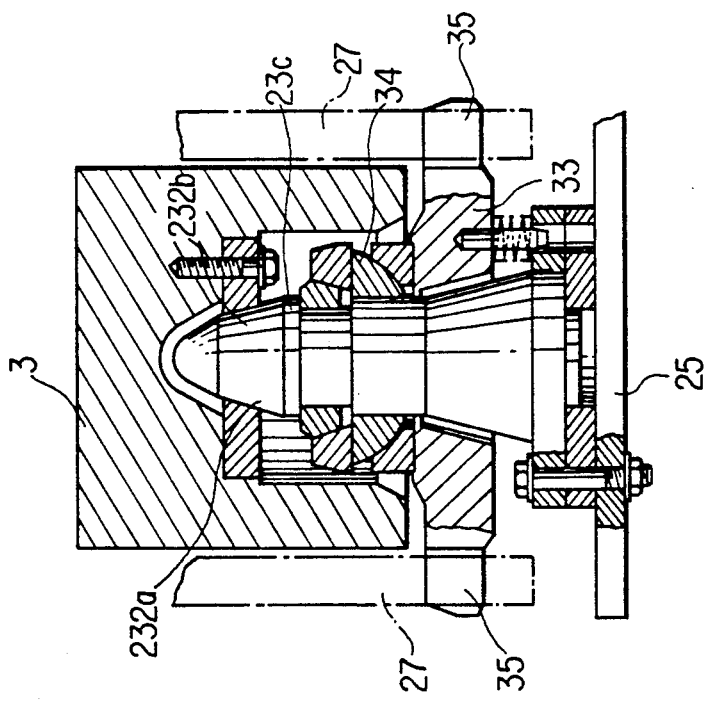

The rear centering device is shown in FIG. 9 and is bolted to the rear cross-member 26 of the adaptor 6. This device comprises a vertical finger 23c having a conical bearing surface 232a at its upper end arranged to engage an annular bearing surface 232b on the movable frame 3 so as to block three degrees of freedom. The rear centering device is disposed at the theoretical point of convergence with the longitudinal axis along which passes the thrust force of the turbojet engine.

Through the action of these centering devices 23, six degrees of freedom are blocked between the adaptor 6 and the movable frame 3, and here again the transmission of assembly stresses to the balance is avoided.

As can be seen from FIGS. 7 to 9, a ring 33 is mounted on each centering finger 23a,b,c, by means of a pivot system 34. The rings 33 each carry two locking lugs 35 arranged to cooperate with locking hooks 27 carried by the movable frame 3 in order to secure the centred adaptor to the frame.

Figure 10:
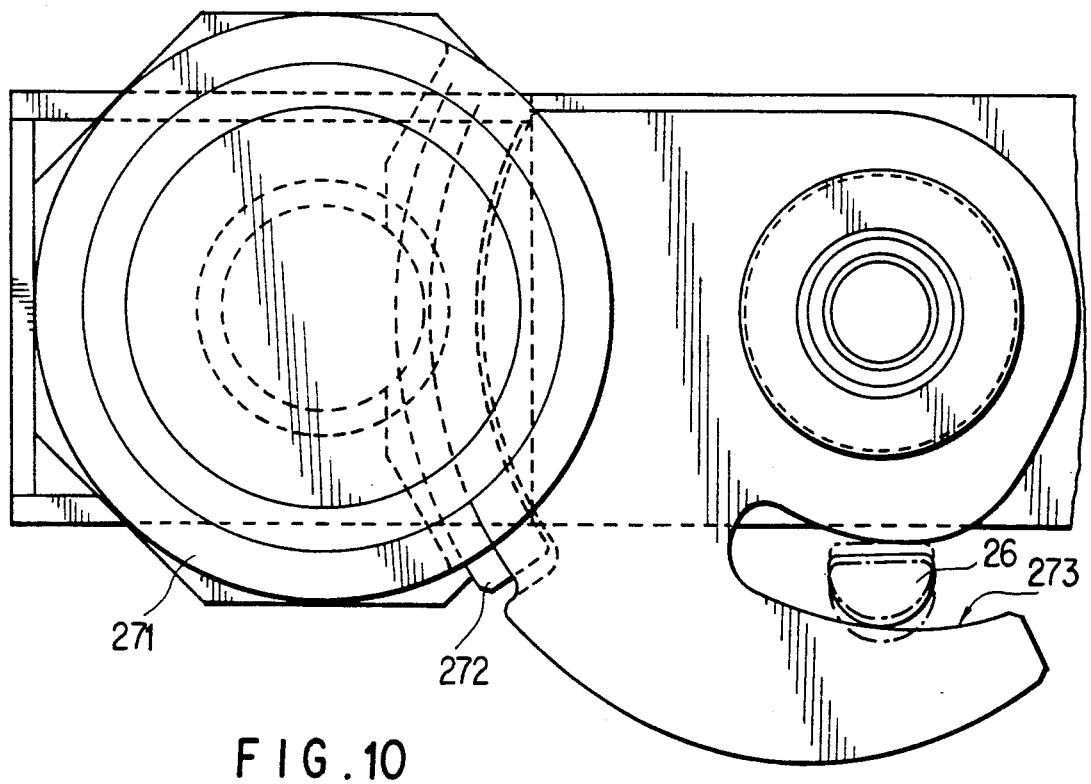
FIG. 10 is a view showing one of the hooks for fixing the adaptor to the movable frame in the preferred embodiment.

A preferred arrangement of the locking hooks 27 is shown in FIG. 10. The hooks pivot about an axis 270 under the action of a driving pinion 271 which engages a toothed segment 272 of the hook. In the arrangement shown, the curve 273 of the hook follows the shape of a logarithmic spiral, which ensures absolute locking of the hook and makes it impossible for the hook to become accidentally released without positive action on the mechanism which operates the unlocking. This enhances the safety of the structure, even in the event of breakage of a driving pinion 271 for example.

To complete the description, it remains to describe exactly how the turbojet engine 5 fitted with its adaptor 6 can be hoisted beneath the movable frame 3 in order to be centred and fixed thereon by means of the hooks 27.

Shown in FIG. 1 is one possible arrangement in which hoisting winches 8 are mounted for movement on a monorail 9 disposed on the ceiling of the building and are able to pass between the front parts 1A and 1B of the interface structure in order to convey the turbojet engine, fitted with its adaptor, to a position vertically under the balance so that it can then be hoisted into engagement with the movable frame.

In another possible arrangement, not shown but easy to imagine, the hoisting system may be fixed to the ceiling of the building in which the test bed is installed.

Figure 11:
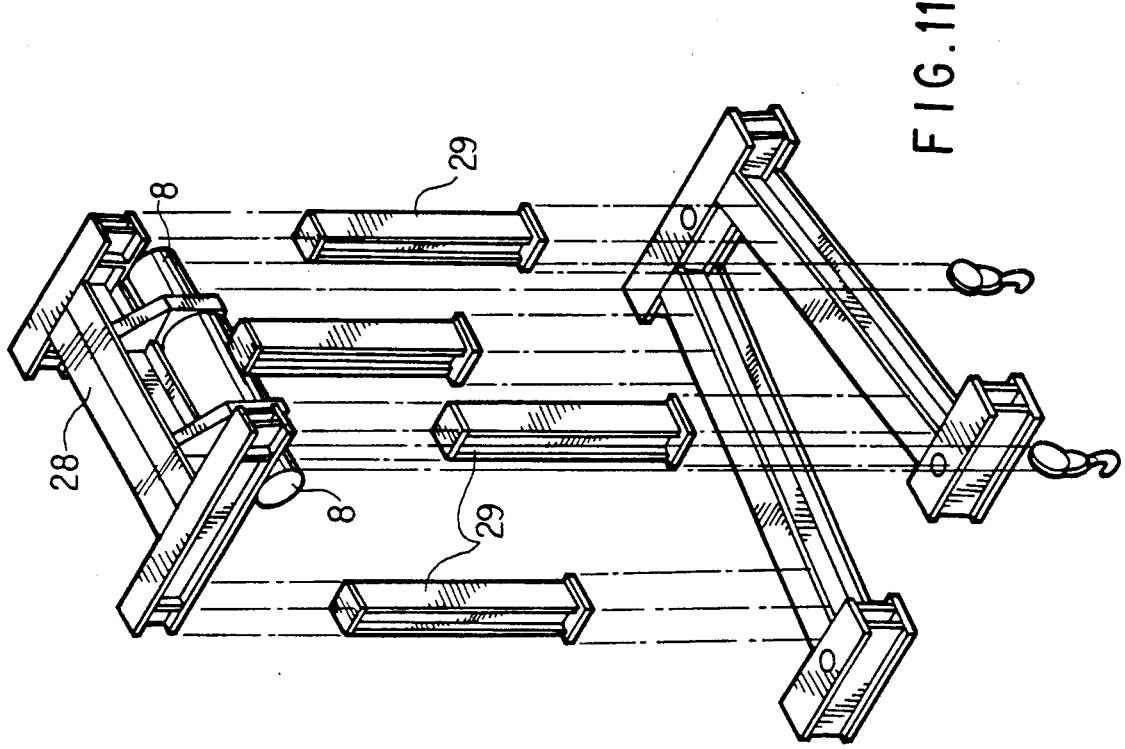
FIG. 11 is an exploded perspective view showing one arrangement for hoisting a turbojet engine towards the balance.

In yet another possible arrangement shown in FIG. 11, the hoisting means may be carried by a structure 28 mounted on upright members 29 carried by the movable frame 3. The advantage of this arrangement is that there is no stress on the flexion strips 2 of the balance during hoisting and centering of the engine on the movable frame.

It also remains to be mentioned that the electrohydraulic connections to the turbojet engine which is to be tested, are achieved through one or two connectors 30 of the adaptor 6 which cooperate with one or two terminal boxes 31 carried by the movable frame and linked by means (32) to the services of the test bed installation (for supply of fuel, measuring and instrumentation cables, etc.).

By reason of its isostatic construction, the major part of the overall structure of the measuring balance in accordance with the invention may be mechanically welded, and expensive machining processes are minimised by the choice at all positions of the assembly of mountings which do not, or only minimally, introduce stress into the balance.

We claim:

1. A thrust measuring balance for measuring the thrust of a turbojet engine comprising an interface structure adapted to be fixed to the ceiling of a building for housing said balance, a movable frame, flexible suspension strips attached to said interface structure and to said movable frame for suspending said movable frame from said interface structure, an adaptor for fitting to said turbojet engine whose thrust is to be measured, connecting means for securing said adaptor to said movable frame so as to mount said turbojet engine to said movable frame, and a thrust measuring system mounted on said interface structure and connected to said movable frame for measuring the longitudinal force exerted on said movable frame by said turbojet engine when said engine is in operation, wherein said flexible suspension strips consist of two front suspension strips disposed in a transverse plane symmetrically one on each side of a longitudinal median plane through said balance, and one rear suspension strip disposed transversely in said longitudinal median plane of said balance, these three suspension strips providing an isostatic suspension of said movable frame from said interface structure, wherein said connecting means includes three centering devices for positioning said adaptor beneath said movable frame, said three centering devices being arranged to ensure isostatic blocking of six degrees of freedom between said adaptor and said movable frame and consisting of two front centering devices disposed in axial alignment with said two front suspension strips, and a rear centering device disposed in axial alignment with said rear suspension strip, said rear centering device blocking three degrees of freedom while a first of said two front centering devices blocks one degree of freedom and a second of two front centering devices blocks two degrees of freedom.

2. A measuring balance according to claim 1, wherein said first front centering device comprises a first vertical finger on said adaptor, said first finger having a part-spherical bearing surface, and a dihedral surface carried by said movable frame for engagement with said part-spherical surface of said first finger.

3. A measuring balance according to claim 2, wherein said second front centering device comprises a second vertical finger on said adaptor, said second finger having a flat end, and a flat surface on said movable frame for engagement with said flat end of said second finger.

4. A measuring balance according to claim 3, wherein said rear centering device comprises a third vertical finger on said adaptor, said third finger having a conical bearing surface, and an annular surface on said movable frame which is engageable with said conical bearing surface of said third finger, said rear centering device being disposed at the theoretical meeting point with the longitudinal axis along which passes the thrust force of said turbojet engine.

5. A measuring balance according to claim 4, wherein said connecting means includes first, second and third rings mounted on said first, second and third fingers respectively, said rings comprising locking lugs, and locking hooks carried by said movable frame for engagement with said locking lugs of said rings.

6. A measuring balance according to claim 5, wherein each of said first, second and third fingers carries pivot means for mounting the respective ring thereon.

7. A measuring balance according to claim 6, wherein said locking hooks (27) are in the shape of a logarithmic spiral.

8. A measuring balance for measuring the thrust of a turbojet engine comprising an interface structure adapted to be fixed to the ceiling of a building for housing said balance, a movable frame, flexible suspension strips attached to said interface structure and to said movable frame for suspending said movable frame from said interface structure, an adaptor for fitting to said turbojet engine whose thrust is to be measured, connecting means for securing said adaptor to said movable frame so as to mount said turbo jet engine to said movable frame, and a thrust measuring system mounted on said interface structure and connected to said movable frame for measuring the longitudinal force exerted on said movable frame by said turbojet engine when said engine is in operation, wherein said flexible suspension strips consist of two front suspension strips disposed in a transverse plane symmetrically one on each side of a longitudinal median plane through said balance, and one rear suspension strip disposed transversely in said longitudinal median plane of said balance, these three suspension strips providing an isostatic suspension of said movable frame from said interface structure, wherein said movable frame is in the form of a horizontal U which is open towards the front said balance, and said interface structure comprise two separate front parts and one central rear part, each of said front parts supporting a respective one of said front suspension strips, and said rear part supporting said rear suspension strip.

* * * * *

UNITED STATES PATENT AND TRADEMARK OFFICE
CERTIFICATE OF CORRECTION

PATENT NO. : 5,170,662
DATED : DECEMBER 15, 1992
INVENTOR(S) : BRAULT ET AL

It is certified that error appears in the above-identified patent and that said Letters Patent is hereby corrected as shown below:

Column 1, line 58, change "Prestresses" to --prestresses--.

Column 3, line 41, change "Part" to --part--.

Column 5, line 12, change "virture" to --virtue--;

line 20, change "Position" to --position--;

line 63, change "centred" to --centered--.

Column 6, line 10, change "centred" to --centered--.

Column 8, line 33, change "comprise" to --comprises--.

Signed and Sealed this

Sixteenth Day of November, 1993

*Attest:*

BRUCE LEHMAN

*Attesting Officer*    Commissioner of Patents and Trademarks